(12) United States Patent
Stewart

(10) Patent No.: US 11,467,313 B1
(45) Date of Patent: Oct. 11, 2022

(54) FOREIGN OBJECT DETECTION SYSTEM AND METHOD

(71) Applicant: NCR Corporation, Atlanta, GA (US)

(72) Inventor: Jamie Stewart, Dundee (GB)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 17/353,924

(22) Filed: Jun. 22, 2021

(51) Int. Cl.
*G01V 3/38* (2006.01)

(52) U.S. Cl.
CPC ...................................... *G01V 3/38* (2013.01)

(58) Field of Classification Search
None
See application file for complete search history.

(56) References Cited

U.S. PATENT DOCUMENTS

| | | | | |
|---|---|---|---|---|
| 8,116,995 B2 * | 2/2012 | Colston | ................ | G01N 27/02 702/57 |
| 10,160,614 B1 * | 12/2018 | Staff | ................ | G01L 1/18 |
| 2004/0129771 A1 * | 7/2004 | Landwehr | ................ | G07D 11/22 235/379 |
| 2009/0314098 A1 * | 12/2009 | Ogawa | ................ | H03K 17/955 73/780 |
| 2019/0139349 A1 * | 5/2019 | Kagano | ................ | G06V 10/147 |

* cited by examiner

*Primary Examiner* — Raul J Rios Russo
*Assistant Examiner* — Carl F. R. Tchatchouang
(74) *Attorney, Agent, or Firm* — Schwegman, Lundberg & Woessner

(57) ABSTRACT

A system and method for identifying a foreign object in a stack of media items is disclosed. An upper clamping plate and an opposing lower clamping plate are positioned to hold a received stack of media items. Each clamping plate has an array of capacitive electrodes positioned on an inner surface thereof. Each of the capacitive electrodes in the one array positioned directly across from a corresponding one in the first array to form a capacitive electrode pair. A controller measures the capacitance of each capacitive electrode pair when the received stack of media items is positioned between the clamping plates, determine if a foreign object is present within the received stack of media items based on the capacitance measurements from each capacitive electrode pair, and generate a signal indicating that a foreign object has been detected when a foreign object is determined to be present.

20 Claims, 4 Drawing Sheets

| Capacitance | Column | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Row 1 | 0.44 | 0.31 | 0.84 | 0.93 | 0.26 | 0.48 | 0.80 | 0.75 | 0.88 | 0.01 | 0.89 | 0.62 |
| 2 | 0.68 | 0.10 | 0.90 | 2.55 | 2.32 | 2.89 | 2.45 | 2.79 | 2.23 | 2.53 | 0.09 | 0.19 |
| 3 | 0.80 | 0.61 | 0.54 | 2.73 | 2.07 | 2.48 | 2.11 | 2.98 | 2.31 | 2.41 | 0.18 | 0.66 |
| 4 | 0.30 | 0.87 | 0.80 | 2.98 | 2.42 | 2.64 | 2.51 | 2.91 | 2.46 | 2.58 | 0.11 | 0.51 |
| 5 | 0.67 | 0.74 | 0.89 | 2.88 | 2.09 | 2.46 | 2.05 | 2.07 | 2.70 | 2.01 | 0.51 | 0.06 |
| 6 | 0.07 | 0.02 | 0.95 | 2.12 | 2.40 | 2.65 | 2.08 | 2.83 | 2.10 | 2.56 | 0.48 | 0.23 |

| Capacitance | | Column | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Row | 1 | 0.20 | 0.98 | 0.88 | 0.62 | 0.69 | 0.89 | 0.90 | 0.49 | 0.00 | 0.47 | 0.65 | 0.13 |
| | 2 | 0.08 | 0.24 | 0.69 | 2.15 | 2.78 | 2.96 | 2.06 | 2.09 | 2.91 | 2.90 | 0.42 | 0.32 |
| | 3 | 0.53 | 0.87 | 0.15 | 2.48 | 2.44 | 2.84 | 2.75 | 2.37 | 2.88 | 2.59 | 0.42 | 0.98 |
| | 4 | 0.27 | 0.27 | 0.96 | 2.43 | 2.10 | 2.33 | 2.01 | 2.70 | 2.37 | 2.13 | 0.93 | 0.14 |
| | 5 | 0.11 | 0.79 | 0.81 | 2.97 | 2.05 | 4.58 | 4.73 | 2.29 | 2.35 | 2.75 | 0.44 | 0.02 |
| | 6 | 0.31 | 0.36 | 0.70 | 2.81 | 2.91 | 4.45 | 4.66 | 2.37 | 2.03 | 2.36 | 0.28 | 0.07 |

FOREIGN OBJECT DETECTION SYSTEM AND METHOD

FIELD

This disclosure relates to a system and method for detecting a foreign object within a stack of one or more checks or banknotes (media items) being inserted into a self-service terminal, such as an automated teller machine (ATM), interactive kiosk, self-checkout machine, or the like.

BACKGROUND

Self-service terminals often include the ability to insert one or more banknotes or checks (collectively "media items") for payment or deposit. Foreign objects such as staples, coins, paper clips (plastic or metal), or rubber bands are often inadvertently included with checks or banknotes being inserted into a self-service terminal. Such foreign objects can potentially damage one or more banknote-handling elements inside the self-service terminal. There is ongoing effort to improve detection of these foreign objects, so that the self-service terminal can return the deposited checks or banknotes to the user and prompt the user to remove the foreign objects. For example, one solution uses a metal detector to identify foreign objects having metal content such as staples and metallic paper clips. This solution is unable to identify non-metallic foreign objects such as rubber bands or plastic paper clips, however. Another solution uses a camera or other image processing methods to visually inspect the inserted checks or banknotes. This solution is quite expensive and complicated to implement.

Accordingly, there is a need for a less expensive and easier to implement solution to identify all foreign objects, metallic and non-metallic included with checks or banknotes being inserted into a self-service terminal.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

The present disclosure employs a capacitive sensor array to detect foreign objects in a stack of media items. The disclosed system (and the related method) provide an improvement over existing solutions because both metallic and non-metallic foreign objects will be identified when present. This solution prevents foreign objects from entering media transport portions of the self-service terminal which could cause damage to belts, rollers, sensors, cameras, etc., included therein. This solution will reduce service calls for the self-service terminal and prevent early life failure of components.

Figure 1:
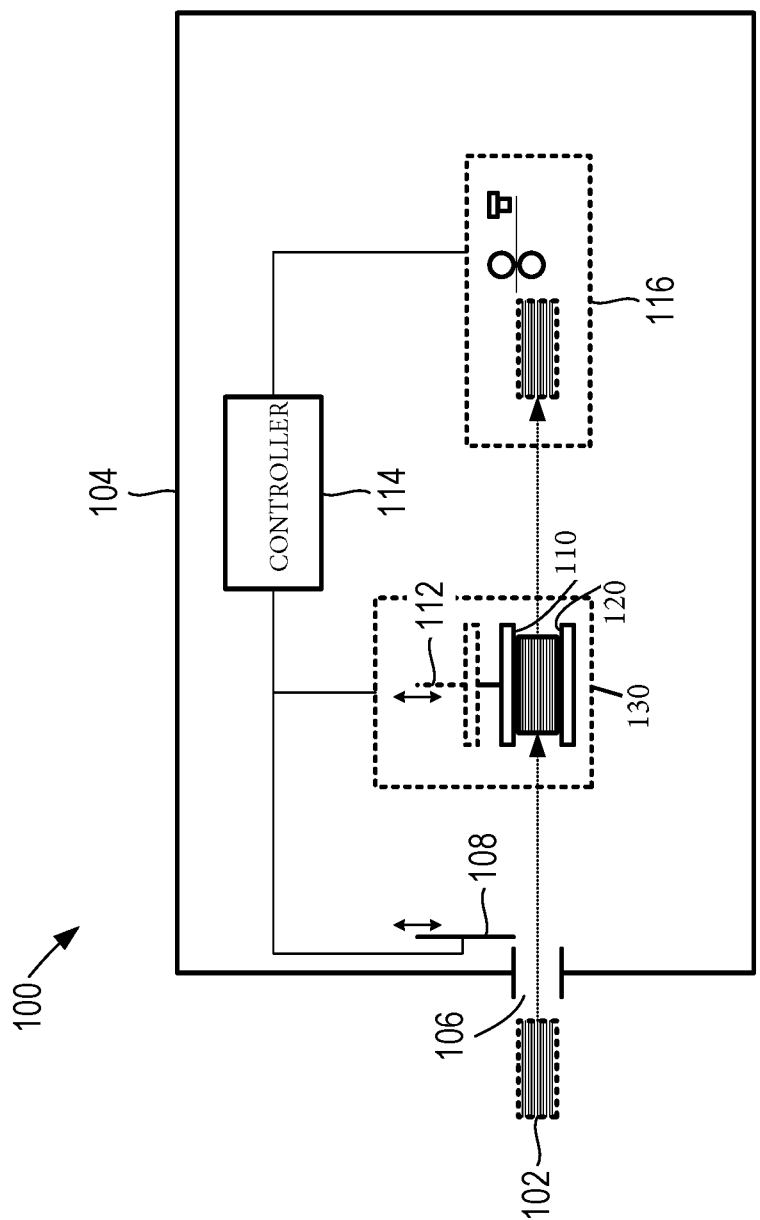
FIG. 1 is a diagram of a system for detecting the presence of foreign objects included with media items being inserted into a self-service terminal according to the present disclosure.

FIG. 1 shows an example of a system 100 for detecting the presence of a foreign object in a stack of media items 102 (i.e., banknotes, checks, or the like). System 100 is part of a self-service terminal such as an automated teller machine, interactive kiosk, self-checkout machine, etc. The system 100 has a housing 104 that typically functions as the exterior of the self-service terminal. In other examples, the housing 104 can form a portion of an interior portion of the self-service terminal, such as a compartment within the self-service terminal. The housing 104 has a port 106 that is sized and shaped to receive a stack of media items 102. A user may insert a stack of media items 102 through the port 106 into the housing 104. The housing 104 may include a door 108 that is controllably movable in order to open and close the port 106. In operation, a user inserts a stack of media items 102 into the port 106, where a gripping assembly 130 grips the media items 102 and transports the media items 102 to a location in the interior of the housing 104. The gripping assembly 130 is coupled to rollers, belts, and/or other suitable mechanisms that can transport the media items 102 within the self-service terminal.

A pair of clamping plates (i.e., upper clamping plate 110 and lower clamping plate 120) are positioned inside of the housing 104 opposing each other as part of the gripping assembly 130. The clamping plates are coupled to a mechanism which controllably moves the upper clamping plate 110 and the lower clamping plate 120 together in order to securely hold the media items 102 in place between the upper clamping plate 110 and the lower clamping plate 120. In some examples, lower clamping plate 120 remains in a fixed position, while an actuator 112 moves the upper clamping plate 110 downwards toward the lower clamping plate 120 that is fixed in position. In other examples, the upper clamping plate 110 and the lower clamping plate 120 move toward each other, with an actuator coupled to each. The pressure applied by actuator 112 (or two actuators) is selected so that the upper clamping plate 110 and the lower clamping plate 120 apply enough force or pressure to hold the stack of media items 102 securely in place without crushing or otherwise damaging any foreign object that may be present within the stack of media items 102.

Figures 2A, 2B:
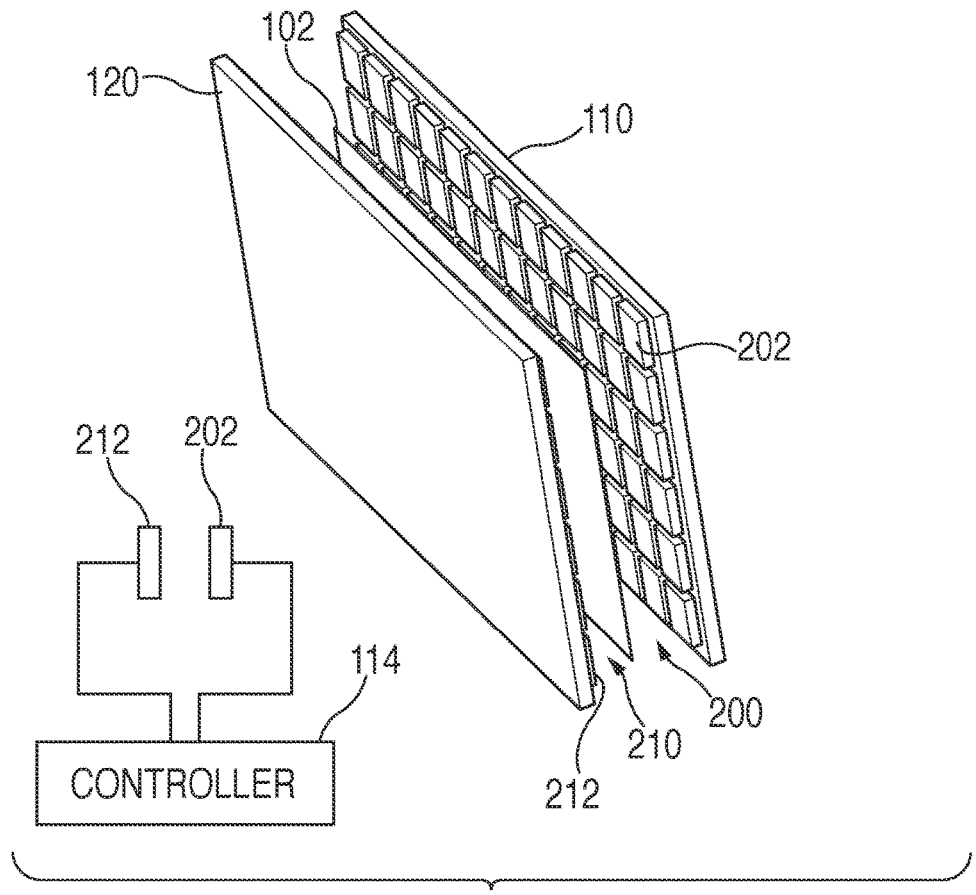
FIG. 2A is a perspective view of a pair of clamping plates including corresponding arrays of capacitive sensors thereon for use in the system of FIG. 1.
FIG. 2B is a table showing the output of the capacitive sensors when no foreign object is present within the stack of media items.

Referring now to FIG. 2A, a first array 200 of capacitive electrodes 202 is positioned on an inner surface of upper clamping plate 110 and a second array 210 of capacitive electrodes 212 is positioned on an inner surface of lower clamping plate 120, with a stack of media items 102 appearing between the upper clamping plate and lower clamping plate during operation of the system 100. There is no foreign object present within the stack of media items 102 in FIG. 2A. Each of the capacitive electrodes 202 in the first array 200 is paired with and positioned directly across from a corresponding one of the capacitive electrodes 212 in the second array 210. In FIG. 2A, each of the two arrays is 12 electrodes by 6 electrodes, but this is only illustrative, and the size of the array can be tailored to the particular application. As will be evident from the following discussion, a larger array can be used to more particularly identify a location of a foreign object within the stack of media items 102 but will be more expensive to implement while a smaller array will provide less specificity and will be less expensive to implement. Each pair of corresponding capacitive electrodes (i.e., one of the capacitive electrodes 202 and one of the capacitive electrodes 212) is separately coupled to a controller 114 which is configured to measure the local capacitance between each pair of capacitive electrodes. Because the amount of capacitance between each pair of capacitive electrodes is proportional to the relative permittivity of the dielectric between the pair of capacitive electrodes and the distance between each of the capacitive plates, the amount of capacitance measured by controller 114 will vary depending on the size and number of media items 102 in the inserted stack and also will vary if any foreign objects are present within the stack of media items 102 (a foreign object present in the stack of media items will change the dielectric constant and increase the distance between the two capacitive plates).

FIG. 2B shows a table 300 of normalized capacitance values measured by the controller 114 when only a stack of media items 102 are present between the upper clamping plate 110 and the lower clamping plate 120, as in FIG. 2A. Typically, the area on the inner surfaces of the upper clamping plate 110 and the lower clamping plate 120 where the capacitive electrodes are positioned will be greater than the area (i.e., length by width) of the expected media items 102. As shown in the table 300 in FIG. 2B, the measured capacitance within the confines of box 305 is between 2.0 and 3.0 while the measured capacitance outside the confines of box 305 is less than 1.0. The area inside box 305 corresponds to the area where the stack of media items 102 is positioned between the upper clamping plate 110 and the lower clamping plate 120, while the area outside box 305 corresponds to the area where there is nothing but free air between the particular ones of the capacitive electrodes 202 on the upper clamping plate 110 and corresponding ones of the capacitive electrodes 212 on lower clamping plate 120. As one of ordinary skill in the art would expect, the measured capacitance for the paired capacitive electrodes within box 305 is higher because the presence of the stack of media items 102 in that area causes the dielectric value in that region to have a higher value. So controller 114 can identify a first region between the upper clamping plate 110 and the lower clamping plate 120 where stack of media items 102 are positioned by identifying a region where all of the capacitive measurements exceed a first threshold (e.g., a normalized capacitance value of 2.0 for the example data shown in table 300). In some applications, the first threshold may be predetermined, based on initial testing prior to implementation. In other applications, the first threshold may be dynamically calculated during each full measurement step. For example, the first threshold can be set as the average of all of the capacitive measurements.

Figures 3A, 3B:
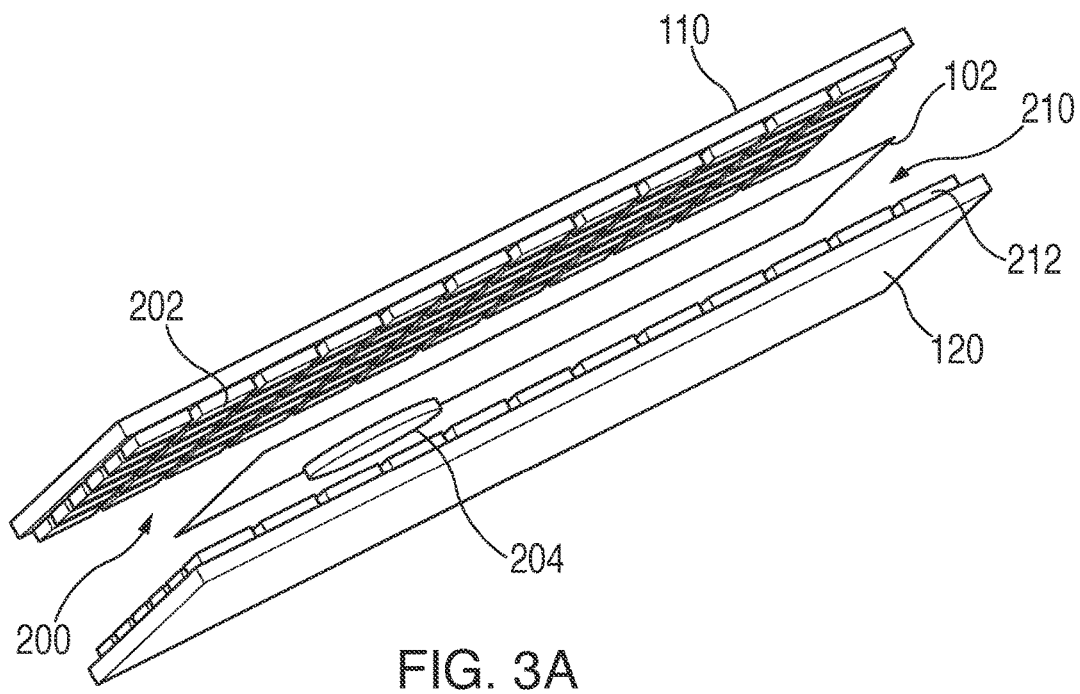
FIG. 3A is a perspective view of a pair of clamping plates including corresponding arrays of capacitive sensors thereon for use in the system of FIG. 1.
FIG. 3B is a table showing the output of the capacitive sensors when a foreign object is present within the stack of media items.

Referring now to FIG. 3A, in this diagram, a foreign object 204 (e.g., a coin) is shown directly adjacent to the stack of media items 102. The table 310 in FIG. 3B shows normalized values of capacitance measured when the stack of media items 102 present between the upper clamping plate 110 and the lower clamping plate 120 includes the foreign object 204, as in FIG. 3A. Similarly to table 300, table 310 includes a box 315 where the measured capacitance values within the confines thereof (except for within the region of box 320) have values between 2.0 and 3.0 while the measured capacitance values outside the confines of box 315 have values less than one. The area within box 315 thus corresponds to the area where the stack of media items 102 is positioned between the upper clamping plate 110 and the lower clamping plate 120 and the area outside box 315 corresponds to the area where there is nothing but free air between the upper clamping plate 110 and the lower clamping plate 120. However, a small portion (i.e., the area within box 320) of the area within box 315 has a significantly higher capacitance value (between 4.4 and 4.8). The area within box 320 corresponds to the area between the upper clamping plate 110 and the lower clamping plate 120 where the foreign object 204 is present. So controller 114 can identify a second region between the upper clamping plate 110 and the lower clamping plate 120 where the foreign object 204 is positioned by identifying a region where all of the capacitive measurements exceed a second threshold (e.g., a normalized capacitance value of 4.0 for the example data shown in table 300). In some applications, the second threshold may be predetermined, based on initial testing prior to implementation. In other applications, the second threshold may be dynamically calculated during each full measurement step. For example, the second threshold can be set as the average of all of the capacitive measurements within the first region.

Controller 114 is positioned in or adjacent to the housing 104 and coupled to the two arrays (i.e., first array 200 and second array 210) of capacitive electrodes. The controller 114 may include a processor, memory, and instructions stored in the memory that are executed on the processor, as known in the art. The controller 114, based on the stored instructions, measures the capacitance of each capacitive electrode pair when a stack of media items is inserted by a user and then determines, based on the relative levels of capacitance measured at each capacitive electrode pair, whether a foreign object is present within the inserted stack of media items 102. This determination may involve, for example, identifying a region where the media items are positioned between the upper clamping plate 110 and the lower clamping plate 120. This can be done in the example shown in table 310 by identifying all measurements having a value greater than a capacitive threshold of 2.0. Then, all the of the measurements within the identified region are compared to determine if any are significantly greater (e.g., greater than second capacitive threshold of 4.0) and thus indicating the presence of a foreign object. In table 310, the measurements within box 320 are significantly higher than the other readings within box 315 (i.e., all are greater than the second capacitive threshold of 4.0), indicating the presence of foreign object 204 as shown in FIG. 2A.

The controller 114 may, in response to identifying the presence of a foreign object, further generate a signal indicating that one or more foreign objects have been detected in the stack of media items. This signal can rigger additional actions, such as opening a door 108 over the port 106, returning the stack of media items 102 through the port 106, and/or displaying a message to a user to remove the stack of media items 102, then remove the foreign object from the stack of media items 102, then return the stack of media items 102 to the port 106.

In operation, if the controller 114 does not detect the presence of a foreign object 204 in the region encompassing the stack of media items 102 (e.g., the controller 114 does not identify any capacitance measurements within the identified region that are significantly greater than others within that region), then the controller 114 can activate a processing mechanism 116 in the housing 104 that can receive the stack of media items 102 from the pair of clamping plates. The processing mechanism 116 can mechanically process each item in the stack of media items 102, one at a time. For example, the processing mechanism 116 can determine the denomination of each media items, can check for authenticity of each media items, ensure a media items (check) was inserted properly, etc.

Figure 4:
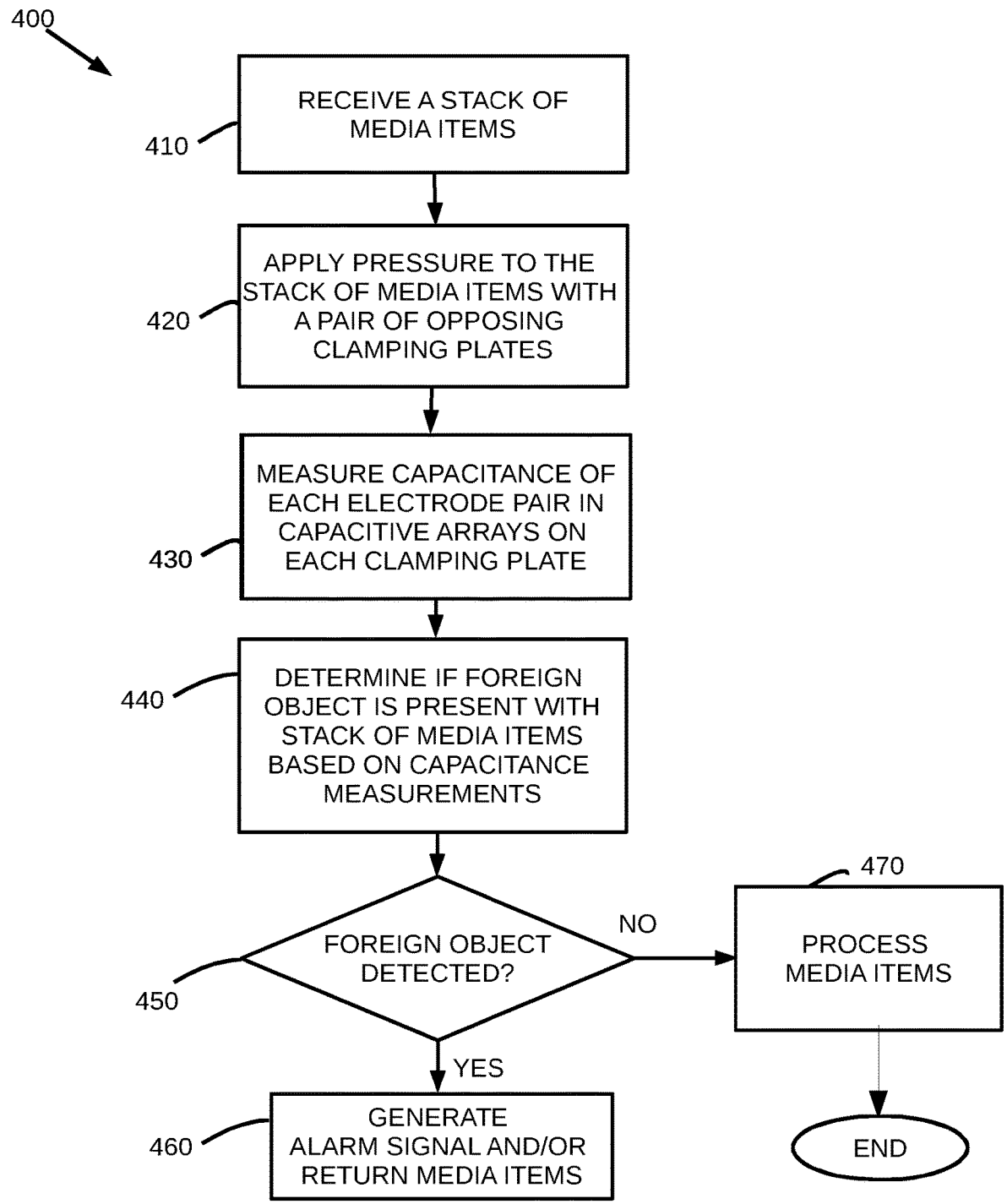
FIG. 4 is a flowchart showing the operation of the system of FIG. 1.

Referring now to FIG. 4, a flowchart 400 shows method of the present disclosure. To start, at step 410 a user inserts a stack of media items 102 for deposit or payment, etc., and the system 100 receives the stack of media items. At step 420, the pair of opposing clamping plates (i.e., upper clamping plate 110 and lower clamping plate 120) apply pressure to hold the stack of media items 102 firmly therebetween. At step 430, the capacitance between each capacitive electrode pair on the capacitive arrays on each clamping plate is measured by the controller 114. At step 440, the capacitance measurements are examined to determine if a foreign object is present. At step 450, processing proceeds to step 470 if no foreign object is present while processing proceeds to step 460 if a foreign object is present. At step 470, the media items are processed in accordance with the operation of the associated self-service terminal. At step 460, an alarm message is generated indicating the presence of a foreign object and/or the inserted media items 102 are returned to the user.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A system, comprising:
   a housing having a port for receiving a stack of media items;
   an upper clamping plate and an opposing lower clamping plate positioned inside the housing and configured to controllably apply pressure to a received stack of media items positioned therebetween to hold the received stack of media items securely in place;
   a first array of capacitive electrodes positioned on an inner surface of the upper clamping plate;
   a second array of capacitive electrodes positioned on an inner surface of the lower clamping plate, the inner surface of the lower clamping plate facing the inner surface of the upper clamping plate, the second array having a same size as the first array, each of the capacitive electrodes in the second array positioned directly across from a corresponding one of the capacitive electrodes in the first array to form a capacitive electrode pair; and
   a controller coupled to the capacitive electrodes in the first array and to the capacitive electrodes in the second array, the controller configured to:
      measure a capacitance of each capacitive electrode pair when the received stack of media items is positioned between the upper clamping plate and the lower clamping plate;
      determine if a foreign object is present within the received stack of media items based on the measured capacitance from each capacitive electrode pair; and
      generate a signal indicating that a foreign object has been detected in the stack of media items when a foreign object is determined to be present; and
   wherein the first array of capacitive electrodes and the second array of capacitive electrodes each have an array size of at least 2 by at least 2.

2. The system of claim 1, wherein the controller determines if the foreign object is present within the received stack of media items based on the measured capacitance from each capacitive electrode pair by first identifying a first region where the measured capacitance exceed a first threshold and then determining if there is a second region within the first region where the measured capacitance exceed a second threshold, the second threshold being higher than the first threshold.

3. The system of claim 2, wherein the first threshold and the second threshold are predetermined.

4. The system of claim 2, wherein the first threshold is dynamically set by calculating an average of the measured capacitance for all of the capacitive electrode pairs.

5. The system of claim 4, wherein the second threshold is dynamically set by calculating an average of the measured capacitance for the capacitive electrode pairs having a measured capacitance value greater than the first threshold.

6. The system of claim 1, wherein the controller prompts a user to remove the stack of media items through the port and to remove the foreign object when determined to be present.

7. The system of claim 1, wherein the first array of capacitive electrodes and the second array of capacitive electrodes each has an area that extends over a surface area that is larger than the surface area of the stack of media items.

8. The system of claim 1, further comprising an actuator for moving one of the upper clamping plate and the lower clamping plate towards the other of the upper clamping plate and the lower clamping plate.

9. The system of claim 1, further comprising:
   a first actuator for moving the upper clamping plate towards the lower clamping plate; and
   a second actuator for moving the lower clamping plate towards the upper clamping plate.

10. The system of claim 1, wherein the first array of capacitive electrodes and the second array of capacitive electrodes each has an array size of 12 by 6.

11. A method, comprising:
   receiving a stack of media items via a port in a housing;
   applying pressure to at least one of an upper clamping plate and an opposing lower clamping plate which are positioned inside the housing so that the received stack of media items is held securely in place between the upper clamping plate and the lower clamping plate, the upper clamping plate having a first array of capacitive electrodes positioned on an inner surface thereof, the lower clamping plate having a second array of capacitive electrodes positioned on an inner surface thereof, the inner surface of the lower clamping plate facing the inner surface of the upper clamping plate, the second array having a same size as the first array, each of the capacitive electrodes in the second array positioned directly across from a corresponding one of the capacitive electrodes in the first array to form a capacitive electrode pair, the first array of capacitive electrodes and the second array of capacitive electrodes each having an array size of at least 2 by at least 2;
   measuring a capacitance of each capacitive electrode pair when the received stack of media items is positioned between the upper clamping plate and the lower clamping plate;
   determining if a foreign object is present within the received stack of media items based on the measured capacitance from each capacitive electrode pair; and selectively generating a signal indicating that the foreign object has been detected in the stack of media items when a foreign object is determined to be present.

12. The method of claim 11, wherein the step of determining comprises:

identifying a first region where the measured capacitance exceed a first threshold and then determining if there is a second region within the first region where the measured capacitance exceed a second threshold, the second threshold being higher than the first threshold.

13. The method of claim 12, wherein the first threshold and the second threshold are predetermined.

14. The method of claim 12, wherein the first threshold is dynamically set by calculating an average of the measured capacitance for all of the capacitive electrode pairs.

15. The method of claim 14, wherein the second threshold is dynamically set by calculating an average of the measured capacitance for the capacitive electrode pairs having a measured capacitance value greater than the first threshold.

16. The method of claim 11, further comprising prompting a user to remove the stack of media items through the port and to remove the foreign object when determined to be present.

17. The method of claim 11, wherein the first array of capacitive electrodes and the second array of capacitive electrodes each has an area that extends over a surface area that is larger than the surface area of the stack of media items.

18. The method of claim 11, wherein the step of applying pressure is performed by an actuator coupled to at least one of the upper clamping plate and the lower clamping plate.

19. The method of claim 11, wherein the step of applying pressure is performed by a first actuator for moving the upper clamping plate towards the lower clamping plate and a second actuator for moving the lower clamping plate towards the upper clamping plate.

20. The method of claim 11, wherein the first array of capacitive electrodes and the second array of capacitive electrodes each has an array size of 12 by 6.

* * * * *